(12) United States Patent
Nakayama

(10) Patent No.: US 9,049,453 B2
(45) Date of Patent: Jun. 2, 2015

(54) IMAGE ENCODING APPARATUS AND METHOD BASED ON INTENSITY OF EDGE INFORMATION

(75) Inventor: Fumitaka Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 2757 days.

(21) Appl. No.: 11/298,861

(22) Filed: Dec. 9, 2005

(65) Prior Publication Data

US 2006/0126729 A1 Jun. 15, 2006

(30) Foreign Application Priority Data

Dec. 14, 2004 (JP) .................................. 2004-361769
Oct. 25, 2005 (JP) .................................. 2005-310070

(51) Int. Cl.
| | |
|---|---|
| *H04N 7/12* | (2006.01) |
| *H04N 19/48* | (2014.01) |
| *H04N 19/176* | (2014.01) |
| *H04N 19/15* | (2014.01) |
| *H04N 19/61* | (2014.01) |
| *H04N 19/124* | (2014.01) |
| *H04N 19/14* | (2014.01) |
| *H04N 19/152* | (2014.01) |

(52) U.S. Cl.
CPC ............. *H04N 19/48* (2014.11); *H04N 19/176* (2014.11); *H04N 19/15* (2014.11); *H04N 19/61* (2014.11); *H04N 19/124* (2014.11); *H04N 19/14* (2014.11); *H04N 19/152* (2014.11)

(58) Field of Classification Search
CPC .............................................. H04N 19/00157
USPC ............ 375/240.01, 240.03, 240.06, 240.08, 375/240.24, 240.26, 240.15

IPC ......................................................... H04N 7/12
See application file for complete search history.

(56) References Cited

U.S. PATENT DOCUMENTS

| | | | | |
|---|---|---|---|---|
| 5,214,507 | A | * | 5/1993 | Aravind et al. .......... 375/240.15 |
| 5,701,368 | A | | 12/1997 | Jung |
| 6,633,611 | B2 | | 10/2003 | Sekiguchi et al. |
| 7,409,098 | B2 | | 8/2008 | Sato et al. |
| 2003/0035477 | A1 | * | 2/2003 | Sekiguchi et al. ....... 375/240.08 |
| 2004/0228536 | A1 | | 11/2004 | Sato et al. |

FOREIGN PATENT DOCUMENTS

| | | |
|---|---|---|
| JP | 02-105792 A | 4/1990 |
| JP | 06-070311 A | 3/1994 |
| JP | 08-275166 A | 10/1996 |
| JP | 11-008848 A | 1/1999 |
| JP | 11-164305 A | 6/1999 |
| JP | 2003-230147 A | 8/2003 |
| JP | 2004-194076 A | 7/2004 |

OTHER PUBLICATIONS

The above references were cited in a Jun. 14, 2011 Japanese Office Action, a copy of which is not enclosed, that issued in Japanese Patent Application No. 2005-310070.

\* cited by examiner

*Primary Examiner* — Young Lee
(74) *Attorney, Agent, or Firm* — Cowan, Liebowitz & Latman, P.C.

(57) ABSTRACT

In an encoding process of a moving image, a macro block as a unit of encoding is further divided into a plurality of DCT blocks or integer conversion blocks to detect an edge of each of the DCT blocks or the integer conversion blocks. Quantization control of the macro block is performed according to detected edge information.

15 Claims, 6 Drawing Sheets

IMAGE ENCODING APPARATUS AND METHOD BASED ON INTENSITY OF EDGE INFORMATION

BACKGROUND OF THE INVENTION

1. Field of the Invention

The present invention relates to an image encoding apparatus and an image encoding method for encoding moving image data, and a program thereof.

2. Related Background Art

The MPEG (Moving Pictures of Experts Group) compression presently adopted by a large number of products is an encoding method combining DCT (Discrete Cosign Transformation), quantization and variable length encoding processes with forward motion compensation inter-frame prediction and bidirectional motion compensation inter-frame prediction. The MPEG normally adopts a GOP (Group of Pictures) structure having fifteen sheets of frame data grouped therein. The GOP is configured by an I picture (Intra-coded picture), a P picture (Predictive-coded picture) and a B picture (Bidirectionally predictive-coded picture). They are video data wherein the I picture is encoded only with information in a picture, the P picture is encoded by performing forward prediction from the I or another P picture, and the B picture is encoded by performing bidirectional prediction from the I or P picture.

An image encoding apparatus corresponding to the MPEG comprises a DCT circuit for performing two-dimensional orthogonal transform to blocks divided from an inputted signal on a predetermined number of pixels basis, that is, a so-called DCT block, a quantization circuit for quantizing a DCT coefficient after the transformation, and a rate control portion for controlling a quantization scale code at a proper value in consideration of an output buffer, that is, a so-called VBV buffer.

For instance, as shown in FIG. 4, an image encoding apparatus 400 corresponding to the MPEG2 holds a video signal captured by CCD 401, and comprises a frame buffer 402 for rearranging the pictures and a subtraction circuit 413 for calculating a difference between the video signal inputted from the frame buffer 402 and a signal representing a local decode image. The image encoding apparatus 400 further comprises a DCT circuit 403, a quantization circuit 404, a variable length encoding circuit 409, an inverse quantization circuit 405, an inverse DCT circuit 406, a motion estimation circuit 407, a motion compensation circuit 408, a recording medium 410, a controller 411 for performing rate control and an activity calculation circuit 412.

In the case of the I picture and P picture, they are used as a referential picture in the motion estimation circuit 407 and motion compensation circuit 408. Therefore, an output of the quantization circuit 404 is also inputted to the inverse quantization circuit 405 where it is inversely quantized, and then subjected to an inverse DCT in the inverse DCT circuit 406. The output of the IDCT circuit 406 is inputted to the motion compensation circuit 408 to be sequentially processed. The motion estimation circuit 407 and motion compensation circuit 408 perform the forward prediction, backward prediction and bidirectional prediction, and output a local-decoded signal to the subtraction circuit 413.

The subtraction circuit 413 is a circuit for performing a subtraction process between the output of the frame buffer 402 and the output of the motion compensation circuit 408 so as to calculate a difference value. In the case of inputting the I picture to be intra-picture-encoded, the video signal simply passes from the frame buffer 402 with no subtraction process performed in the subtraction circuit 413.

The I picture, or the P and B pictures represented by the difference values undergo the DCT in the DCT circuit 403, and then are quantized in the quantization circuit 404, variable-length-encoded in the variable length encoding circuit 409 and recorded on the recording medium 410.

The quantization scale code to be used in the quantization circuit 404 is decided by using an activity reflecting a reference value of the quantization scale code calculated by the controller 411 and a visual characteristic of a macro block as a unit of quantization. The method of deciding the quantization scale code is configured by the following three steps.

In a first step, an assigned bit amount for each individual picture in the GOP is distributed based on the bit amount assigned to the pictures still not encoded in the GOP including assignment subject pictures. This distribution is repeated in order of the encoded pictures in the GOP so as to set up a picture target bit amount for each individual picture.

In a second step, the reference value of the quantization scale is set up per macro block. To be more specific, in the second step, the reference value of the quantization scale is acquired by feedback control per macro block based on information on a virtual buffer capacity (VBV buffer capacity) obtained from the variable length encoding circuit 409 in order to match the assigned bit amount for each individual picture acquired in the first step with an actual generated bit amount.

In a third step, the quantization scale value is corrected per macro block based on the activity of the macro block in order to reflect the visual characteristic. While maintaining a frame target bit amount, the quantization scale is corrected to be smaller than the reference value as to the macro block of which activity is low and corrected to be larger than the reference value as to the macro block of which activity is high. Thus, adaptive quantizing is performed in consideration of the visual characteristic, in particular, the activity.

Such a basic technique of the MPEG is disclosed in "General Multimedia Selection: MPEG" (Ohm-sha) and "Information Compression Technology for Digital Broadcast and Internet" (Kyoritsu Shuppan Co., Ltd.) for instance. There is also a patent document (Japanese Patent Application Laid-Open No. 2004-194076) which discloses a technique of calculating the activity and applying it to rate control.

As for the encoding processes of the MPEG2 and the newly standardized MPEG4—AVC (also referred to as H. 264), it is prescribed that the quantization is performed on a macro block basis and the DCT is performed on a DCT block basis. Only one quantization scale code is decided for one macro block. Therefore, in the case of the MPEG, the quantization is performed to six DCT blocks (four luminance components and two color difference components) included in one macro block with the same quantization scale code. For that reason, in the case where the DCT blocks including edges and the DCT blocks including no edge are mixed among the DCT blocks configuring one macro block, the quantization is performed with the same quantization scale code while their power distributions are different. This is by no means desirable from a viewpoint of the visual characteristic.

For that reason, the quantization scale code of the DCT blocks including the edges should be set small. If an area having the edges is small in the case of calculating edge information on the macro block basis, however, the edge information is detected to be weak against the size of the macro block. Consequently, there is a possibility to be determined that no edge exists in the macro block. It is also thinkable that, if per macro block, a noise component is falsely detected as the edge. In that case, there is usually no large signal difference as to the falsely detected noise component, and so edge intensity is determined to be low and the quantization scale code is set to a high value so as to degrade the DCT blocks including the edges. For that reason, the degradation of the DCT blocks consequently appears as the degradation of the macro blocks and induces the degradation of image quality.

SUMMARY OF THE INVENTION

An object of the present invention is to provide an image encoding apparatus and an image encoding method capable of solving the aforementioned problem and preventing degradation of image quality of blocks including edges in an encoding process of a moving image, and a program thereof.

As a preferred embodiment under the object, the image encoding apparatus of the present invention comprises: encoding means for dividing a pixel arrangement included in an image into a plurality of first blocks and performing an encoding process on a first block basis; edge detecting means for further dividing the first blocks into a plurality of second blocks and detecting edges of the second blocks; calculating means for calculating edge information of the first blocks based on edge characteristics detected for each second block by the edge detecting means; and encoding controlling means for outputting control information on the encoding process to the encoding means, on the basis of the edge information calculated by the calculating means.

In addition, the image encoding method of the present invention comprises: an encoding step of dividing a pixel arrangement included in an image into a plurality of first blocks and performing an encoding process on a first block basis; an edge detecting step of further dividing the first blocks into a plurality of second blocks and detecting edges of the second blocks; a calculating step of calculating edge information of the first blocks based on edge characteristics detected for each second block in the edge detecting step; and an encoding controlling step of outputting control information on the encoding process performed in the encoding step, on the basis of the edge information calculated in the calculating step.

Further, a computer-readable program of the present invention is the one for causing a computer to execute an image encoding method comprising: an encoding step of dividing a pixel arrangement included in an image into a plurality of first blocks and performing an encoding process on a first block basis; an edge detecting step of further dividing the first blocks into a plurality of second blocks and detecting edges of the second blocks; a calculating step of calculating edge information of the first blocks based on edge characteristics detected for each second block in the edge detecting step; and an encoding controlling step of outputting control information on the encoding process performed in the encoding step, on the basis of the edge information calculated by the calculating step.

The objects and characteristics of the present application other than those described above will be clarified by the following detailed description of embodiments of the invention with reference to the drawings.

DETAILED DESCRIPTION OF THE PREFERRED EMBODIMENTS

Hereunder, embodiments of the present invention will be described in detail by using the drawings.

First Embodiment

An image encoding apparatus according to a first embodiment of the present invention will be described by taking as an example a digital video camera for encoding a video signal obtained by photographing by means of the MPEG2 and recording it.

Figure 1:
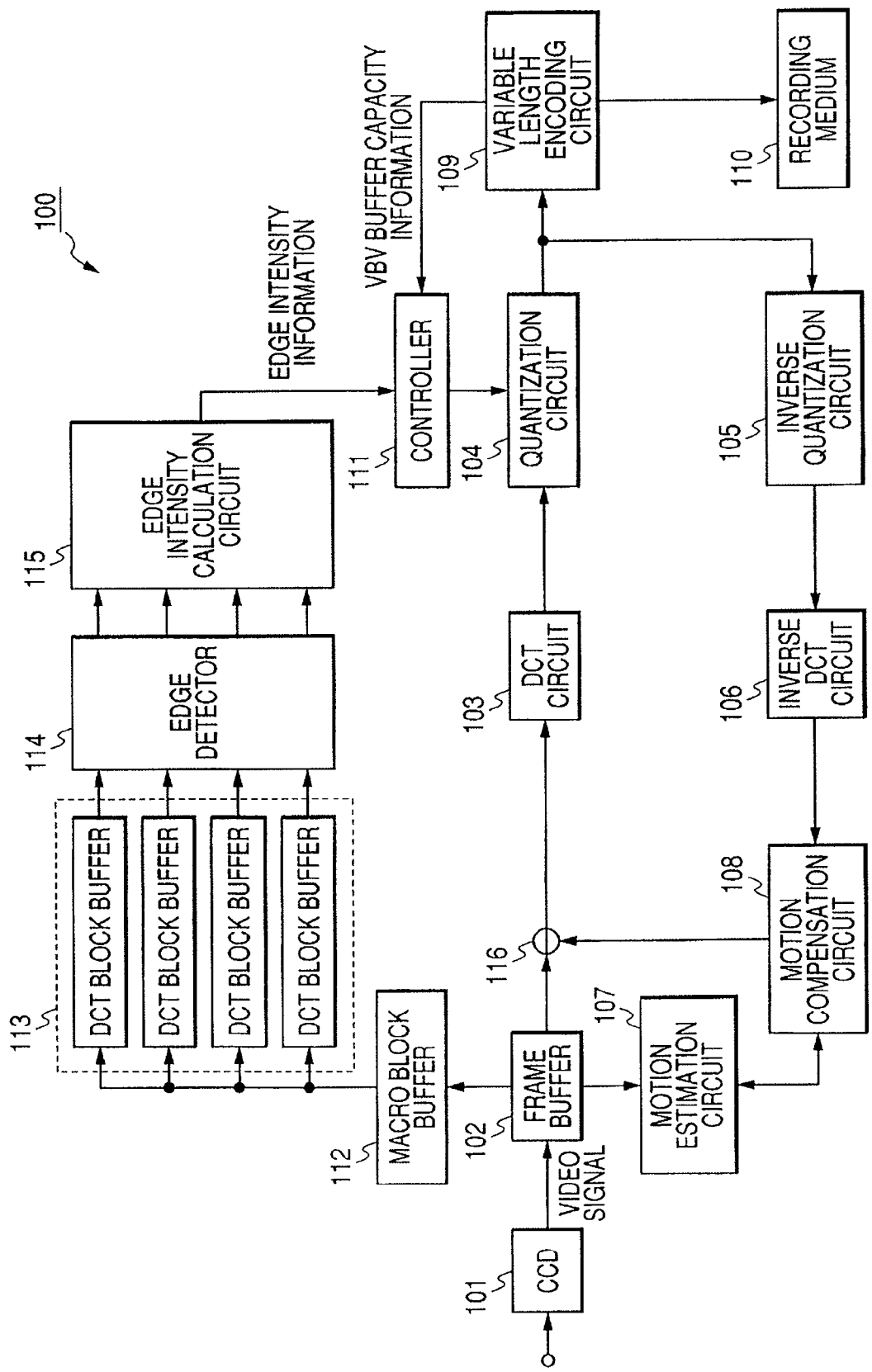
FIG. 1 is a diagram showing an overview configuration of a digital video camera (image encoding apparatus) according to a first embodiment of the present invention.

FIG. 1 is a diagram showing an overview configuration of a digital video camera (image encoding apparatus) 100 according to the first embodiment of the present invention. The digital video camera 100 according to this embodiment is characterized by using edge information on DCT blocks when deciding a quantization scale code of macro blocks in an encoding process.

Figure 4:
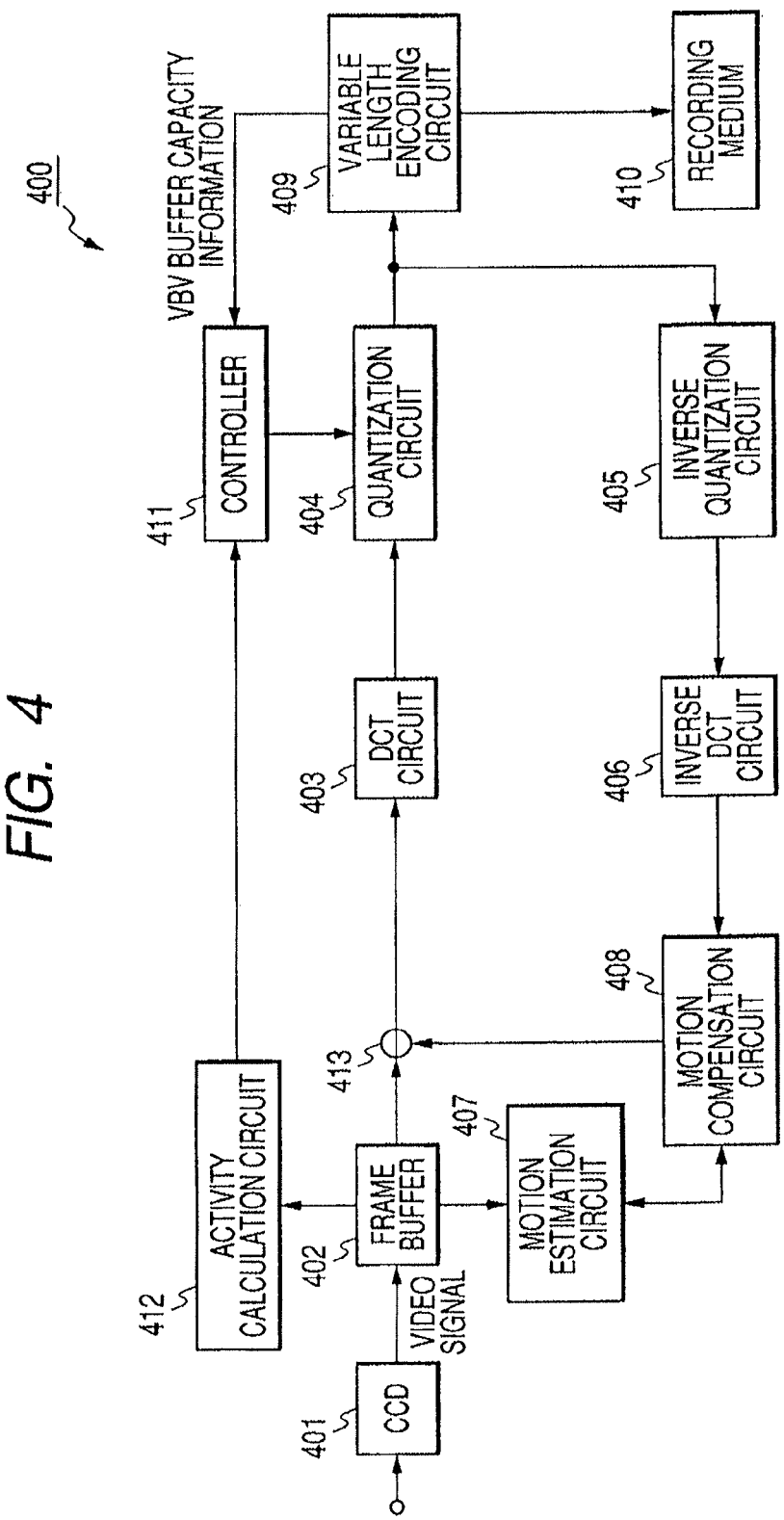
FIG. 4 is a diagram showing a configuration example of a conventional image encoding apparatus.

In FIG. 1, reference numeral 101 denotes an image taking portion including an image pickup device such as a CCD (Charge-Coupled Device), an A/D converter and the like for instance, which outputs the video signal (moving image data). Reference numeral 102 denotes a frame buffer for temporarily storing an inputted video signal. Reference numeral 103 denotes a DCT circuit, 104 denotes a quantization circuit, 105 denotes an inverse quantization circuit, 106 denotes an IDCT (inverse DCT) circuit, 107 denotes a motion estimation circuit, and 108 denotes a motion compensation circuit. Reference numeral 109 denotes a variable length encoding circuit. Reference numeral 110 denotes a recording medium for recording video data encoded by the variable length encoding circuit 109. The recording medium 110 is an optical disk such as a removable DVD, a semiconductor memory card or a magnetic tape for instance. It may also be a built-in hard disk or the like. Reference numeral 116 denotes a subtraction circuit. Reference numerals 102 to 110 shown in FIG. 1 denote the same functions as 402 to 410 shown in FIG. 4, and reference numeral 116 shown in FIG. 1 denotes the same function as 413 shown in FIG. 4 respectively.

Reference numeral 111 denotes a controller for controlling the quantization scale code of the quantization circuit 104 and also controlling the entire system. Reference numeral 112 denotes a macro block buffer which is a memory holding the same data as macro block data still not encoded as to the moving image data stored in the frame buffer 102. Reference numeral 113 denotes a DCT block buffer for storing the data which is the macro block data held by the macro block buffer 112 divided into DCT blocks. As shown in FIG. 1, there four DCT block buffers 113. This is corresponding to the fact that the macro block of the MPEG2 includes the four DCT blocks.

Reference numeral 114 denotes an edge detector for performing edge detection to the data held by each of the DCT block buffers 113 to obtain edge intensity. Reference numeral 115 denotes an edge intensity calculation circuit for deciding the edge intensity of the macro block by using the edge intensity of each DCT block obtained by the edge detector 114.

Next, an encoding operation of the digital video camera 100 will be described. The video signal obtained by an image-taking operation of a CCD 101 is held by the frame buffer 102 once. And in case of an intra-picture encoding mode, the video signal is divided into the macro blocks, a DCT process is performed to the signal in the macro block in the DCT circuit 103, and a DCT coefficient is quantized in the quantization circuit 104 by using the quantization scale code decided by the controller 111, to variable-length-encode it in the variable length encoding circuit 109.

In case of an inter-picture encoding mode, inverse quantization is performed first to the pictures already encoded in the inverse quantization circuit 105, and a local decode image having undergone an inverse DCT process is produced in the IDCT circuit 106. Next, motion estimation and motion compensation are performed by using the picture to be encoded, which is the video signal held by the frame buffer 102, to generate the local decode image having undergone the motion compensation. Furthermore, the subtraction circuit 116 calculates a difference value between the video signal held by the frame buffer 102 and the signal of the local decode image having undergone the motion compensation. The calculated difference value is used to perform DCT process to the signal in the macro block in the DCT circuit 103, and the DCT coefficient is quantized in the quantization circuit 104 by using the quantization scale code decided by the controller 111, to variable-length-encode it in the variable length encoding circuit 109.

The above is an overview of the encoding operation of the digital video camera 100. Here, a description will be given as to details of the operation of the controller 111 relating to the decision of the quantization scale code used in the quantization circuit 104.

The controller 111 distributes an assigned bit amount for each individual picture in the GOP on the basis of the bit amount assigned to the pictures still not encoded in the GOP including assignment subject pictures. This distribution is repeated in order of the encoded pictures in the GOP to set up a picture target bit amount for each individual picture. Next, the controller 111 acquires the reference value of the quantization scale by feedback control on the macro block basis on the basis of information on a virtual buffer capacity (VBV buffer capacity) obtained from the variable length encoding circuit 109 in order to match the assigned bit amount for each individual picture with an actual generated bit amount. The above operation is the same as the previously described steps 1 and 2.

Furthermore, of the video signals held in the frame buffer 102, the same data as the macro block data just to be encoded is held in the macro block buffer 112. The macro block buffer 112 may be rendered common with the macro block buffer used by the motion compensation circuit 108. The image data held in the macro block buffer 112 is divided into the DCT blocks of which size is smaller than the macro block, to be held in each of the DCT block buffers 113. The edge detector 114 detects the edge intensity of each of the DCT blocks by using the image data (DCT block data) held by each of the DCT block buffers 113. Furthermore, the edge intensity calculation circuit 115 calculates the highest edge intensity of the edge intensities detected from the image data of each of the DCT blocks, to output the information on the calculated edge intensity (edge intensity information) to the controller 111. The edge intensity information is used to decide the edge intensity of the macro block.

As for the edge detection and intensity calculating means, various techniques have been conventionally proposed, and so an arbitrary method may be used. Here, some edge detectors and an example of the edge intensity calculation circuit thereof will be taken up. For instance, in the case of using a spatial domain, an edge detection process with the edge detector such as a canny edge detector or a sober edge detector is performed to each of the pixels in the DCT blocks to calculate a ratio between the number of the pixels exceeding a predetermined threshold and the number of the pixels of the DCT blocks, as the edge intensity. In the case of using a frequency domain, it is also possible to perform an orthogonal transform such as a DCT transform or a Hadamard transform to the DCT blocks and calculate a sum of absolute values or a sum of squares of orthogonal transform coefficients corresponding to vertical edge components, horizontal edge components and diagonal edge components, to calculate the edge intensity by using such information.

The controller 111 calculates the quantization scale code for performing actual quantization by adjusting the reference value of the quantization scale code calculated by the aforementioned calculation, in accordance with the edge intensity information calculated by the edge intensity calculation circuit 115. In the case where the edge intensity information indicates zero, that is, no edge existing in the macro block, the controller 111 uses the reference value of the quantization scale code as the quantization scale code for performing actual quantization.

Figure 2A:
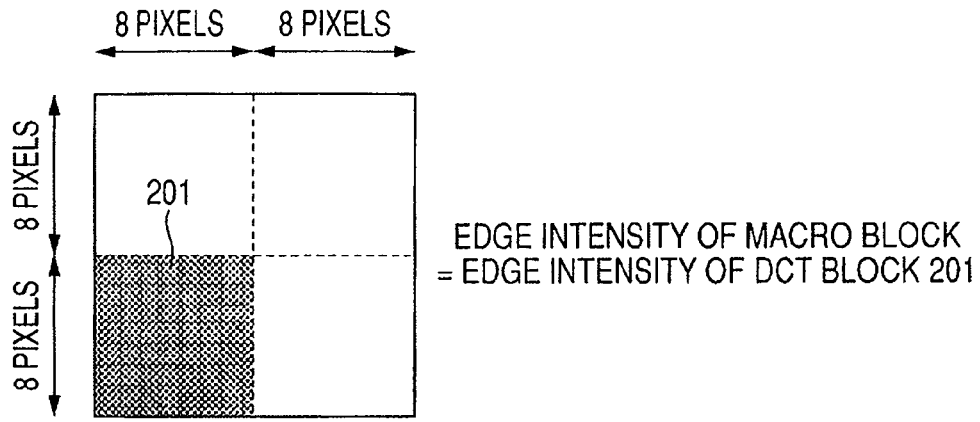
FIGS. 2A, 2B and 2C are diagrams showing examples of an edge intensity calculation method according to a status of each individual macro block.
Figure 2B:
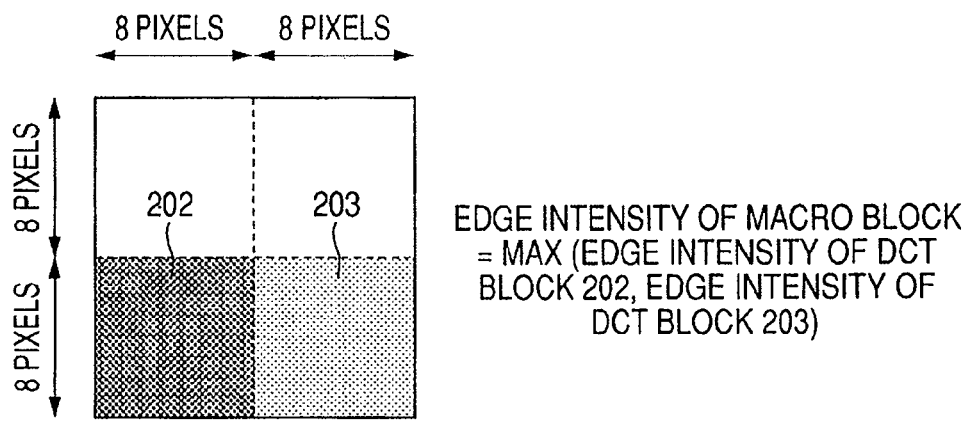
Figure 2C:
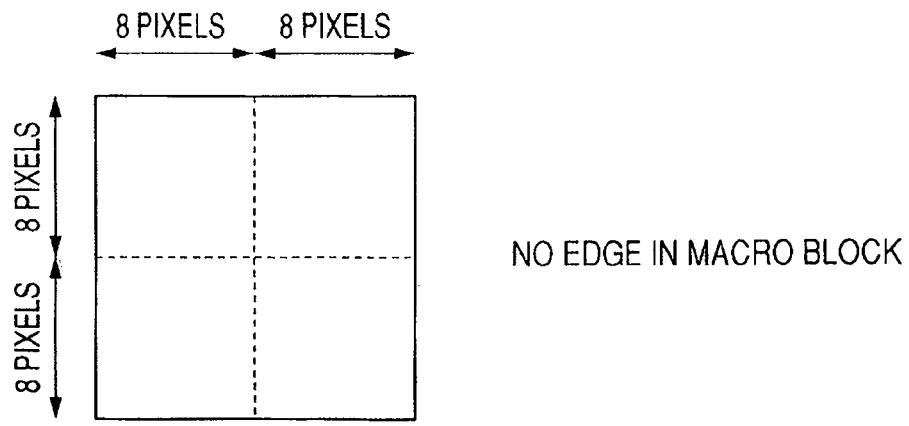

Hereunder, an example of a calculation method of the edge intensity according to a status of each macro block is shown by using the drawings. FIGS. 2A, 2B and 2C are diagrams showing the example of the calculation method of the edge intensity according to the status of each macro block. FIG. 2A shows the case where, as a result of edge detection performed to each of the DCT block in the macro block in the edge detector 114, it is determined that the edge exists only in one DCT block 201. In this case, the edge intensity calculation circuit 115 determines that the edge exists in the macro block and outputs the edge intensity of the DCT block 201 including the edge as the edge intensity of the macro block. Thus, the controller 111 calculates the quantization scale code for performing actual quantization by reducing the reference value of the quantization scale code according to the edge intensity outputted by the edge intensity calculation circuit 115.

FIG. 2B shows the case where, as a result of the edge detection performed to each of the DCT block in the macro block, it is determined that the edges exist in the DCT blocks 202 and 203. In this case, the edge intensity calculation circuit 115 determines that the edges exist in the macro block and compares the edge intensity of the DCT block 202 with that of the DCT block 203 to output the higher one as the edge intensity of the macro block. To be more specific, the controller 111 adopts the highest edge intensity of the DCT block in the macro block. Thus, the controller 111 calculates the quantization scale code for performing the actual quantization by reducing the reference value of the quantization scale code according to the edge intensity outputted by the edge intensity calculation circuit 115.

FIG. 2C shows the case where, as a result of the edge detection performed to each of the DCT block in the macro block, it is determined that no edge exists in the DCT blocks. In this case, the edge intensity calculation circuit 115 determines that no edge exists in the macro block and outputs no edge intensity (or may outputs the edge intensity=0). Thus, the controller 111 uses the reference value of the quantization scale code as-is as the quantization scale code for performing the actual quantization.

The quantization scale code calculated by the controller 111 is set up as the quantization scale code of the quantization circuit 104, and is used for the quantization of the DCT blocks included in the macro block.

As described above, in the encoding process of the moving image, the image encoding apparatus of this embodiment uses the edge information on the DCT block which is a smaller block than the macro block, as the edge information on the macro block to perform the process of deciding the quantization scale code of the macro block. Therefore, it is possible to prevent degradation of the image quality of the macro block partially including the edges. In the case where the edges are detected from the plurality of DCT blocks included in the macro block, the highest edge intensity is rendered as the edge intensity of the macro block as shown in FIG. 2B. Thus, even in the case where one of the edges detected from the plurality of DCT blocks is a falsely detected noise component, it is possible, as the edge intensity of the noise component is normally weak, to prevent the wrong information that the edge intensity is weak due to the false detection from influencing the decision of the quantization scale code.

Second Embodiment

Next, as a second embodiment, a description will be given as to the image encoding apparatus for deciding the quantization scale code in consideration of the edge intensity and edge directions of the DCT blocks. To be more precise, it is determined whether or not the edge is visually noticeable in the macro block from the information on the edge intensity and edge directions of each of the DCT blocks included in the macro block to multiply the edge intensity by a coefficient according to that determination. The configuration of the image encoding apparatus of the second embodiment is the same as that of the first embodiment shown in FIG. 1, and so a description thereof will be omitted.

The controller 111 acquires the reference value of the quantization scale by controlling a code amount on a macro block basis as with the first embodiment. Furthermore, of the video signals held in the frame buffer 102, the same image data as the macro block just to be encoded is held in the macro block buffer 112. The image data held in the macro block buffer 112 is divided into the DCT blocks of which size is smaller than the macro block, to be held in each of the DCT block buffers 113. The edge detector 114 detects the edge intensity and direction of each of the DCT blocks by using the image data (DCT block data) held by each of the DCT block buffers 113.

It is possible to detect the edge intensity of each of the DCT blocks by the same technique as the above-mentioned first embodiment. As for the edge direction, there are proposals of various techniques using the spatial domain, frequency domain and the like, any of which can be used to detect it. For instance, in the case of the technique using the spatial domain, edge detection for detecting each of a vertical edge direction, a horizontal edge direction and a diagonal edge direction is performed to each of the pixels in the DCT block. The most frequent direction is the edge direction of the DCT block. In the case of the technique using the frequency domain, comparisons are made as to the sum of absolute values and the sum of squares of the orthogonal transform coefficients corresponding to the vertical edge components, horizontal edge components and diagonal edge components after the orthogonal transform to determine the direction having the highest value as the edge direction of the DCT block.

The edge detector 114 detects the edge intensity and edge direction of each of the DCT blocks in the macro block by the technique exemplified above and the like, to output the detection results to the edge intensity calculation circuit 115. Furthermore, the edge intensity calculation circuit 115 puts together the information on the edge intensity and direction detected from the image data of each of the DCT blocks on the macro block basis and determines whether or not the edge is visually noticeable, to output the edge intensity information according to the determination results to the controller 111. The edge intensity information is used to decide the edge intensity of the macro block. The controller 111 calculates the quantization scale code for performing the actual quantization by adjusting the reference value of the quantization scale code calculated by the aforementioned calculation, in accordance with the edge intensity information calculated by the edge intensity calculation circuit 115.

Figure 3A:
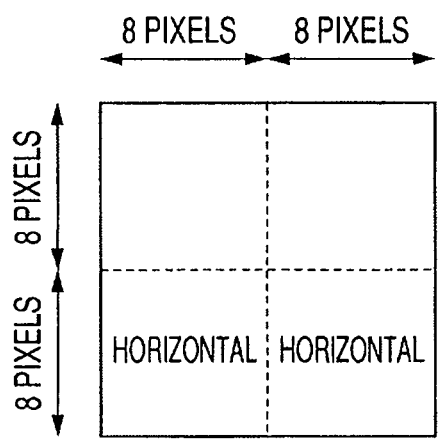
FIGS. 3A, 3B, 3C and 3D are diagrams showing examples of information processing relating to edge intensity and edge directions according to a second embodiment.
Figure 3B:
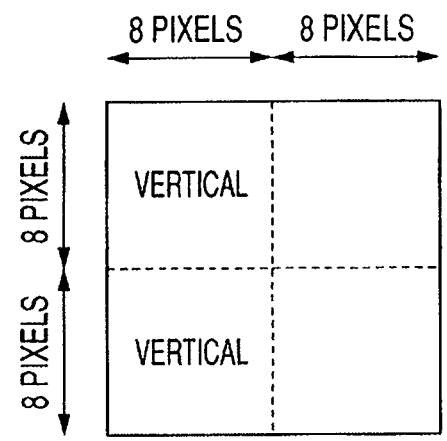
Figure 3C:
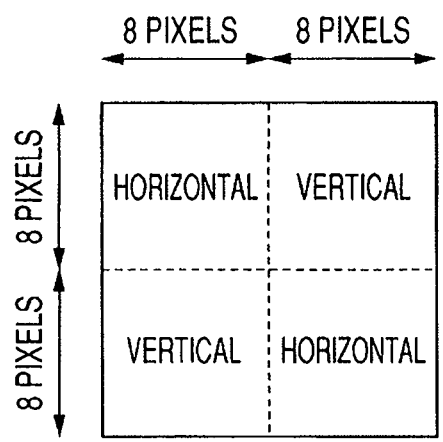
Figure 3D:
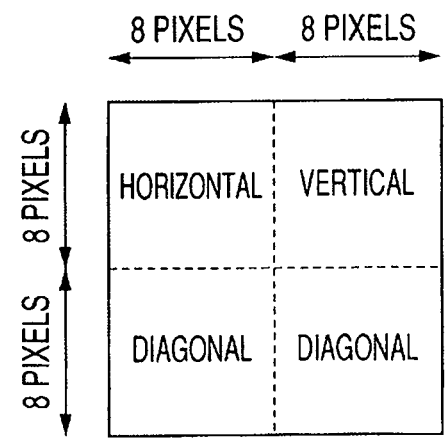

Hereunder, a description will be given as to the examples of information processing relating to edge intensity and edge directions according to the second embodiment. FIGS. 3A, 3B, 3C and 3D are diagrams showing the examples of the information processing relating to the information on the edge intensity and edge directions according to the second embodiment. The examples in FIGS. 3A to 3D show only luminance components, and indicate that each of the macro blocks is configured by four DCT blocks of the luminance components. FIGS. 3A and 3B indicate the cases where the edges are determined to be noticeable due to placement of the edge direction. FIGS. 3C and 3D indicate the cases where the edges are determined to be unnoticeable due to placement of the edge direction.

For instance, in the case where both the DCT blocks horizontally adjacent are detected as the horizontal edges as shown in the macro block of FIG. 3A, or in the case where both the DCT blocks vertically adjacent are detected as the vertical edges as shown in FIG. 3B, the edge intensity calculation circuit 115 determines that a visually noticeable edge exists and outputs a value having multiplied the edge intensity calculated by the same method as in the first embodiment by a predetermined weighting factor as the edge intensity information. The controller 111 calculates the quantization scale code for performing actual quantization by reducing the reference value of the quantization scale code according to the edge intensity information outputted by the edge intensity calculation circuit 115.

As shown in the macro blocks of FIGS. 3C and 3D, if it is detected that the edge directions of the DCT blocks are varied after detecting the edges from all the DCT blocks, the edge intensity calculation circuit 115 determines that the edges exist in the macro block but are visually unnoticeable edges, to perform the same process (same process as FIG. 2C) as in the case of having no edge existing in the macro block. Thus, the controller 111 uses the reference value of the quantization scale code as-is as the quantization scale code for performing the actual quantization.

In the case where it is detected that the edge intensity detected in the edge detector 114 is low or there is no edge, it is highly possible that the macro block is a texture portion including a lot of flat portion or high-frequency components (hereafter, merely the texture portion). It is generally said that, as a human visual characteristic, noise is noticeable in the flat portion and unnoticeable in the texture portion. For that reason, in the case of receiving the edge intensity information calculated as having low edge intensity or having no edge, the controller 111 uses the information other than the edge detection to determine whether the flat portion or the texture portion, and perform separation. As for the processes of determining the flat portion and the texture portion and separating them, there is a suitable method of determining and separating them by using a distributed value in the case of the spatial domain, and using the sum of absolute values and the sum of squares of AC components of the orthogonal transform in the case of the frequency domain.

The controller 111 calculates the quantization scale code for performing the actual quantization by reducing the reference value of the quantization scale code as to a flat macro block, and calculates the quantization scale code for performing the actual quantization by increasing the reference value of the quantization scale code as to the texture portion. The controller 111 sets up the calculated quantization scale code as the quantization scale code of the quantization circuit 104. Thus, the quantization scale code is used for the quantization of the DCT blocks included in the macro block.

As described above, in the encoding process of the moving image, the image encoding apparatus of this embodiment uses the edge information on the DCT block which is a smaller block than the macro block, as the edge information on the macro block to perform the process of deciding the quantization scale code of the macro block. Therefore, it is possible to prevent degradation of the image quality of the macro block partially including the edges. Furthermore, it is determined, as the edge information, whether or not the edge is visually noticeable in consideration of the edge direction of each of the DCT blocks. If determined as a noticeable edge, the edge intensity is multiplied by a predetermined weighting factor. Thus, even in the case of the same edge intensity, the more visually noticeable the edge is, the larger the outputted value as the edge intensity becomes. Therefore, it is possible to decide the quantization scale code for performing appropriate quantization to the visually noticeable edge.

Third Embodiment

Next, as a third embodiment, a description will be given as to the image encoding apparatus for deciding the quantization scale code in consideration of the edge intensity and edge directions of the DCT blocks. To be more precise, it is determined whether or not the edge is visually noticeable in the macro block, from the information on the edge intensity and edge directions of each of the DCT blocks included in the macro block and the DCT blocks included in the macro block adjacent to the macro block, to multiply the edge intensity by a coefficient according to that determination. The configuration of the image encoding apparatus of the third embodiment is the same as that of the first embodiment shown in FIG. 1, and so a description thereof will be omitted.

The controller 111 obtains the reference value of the quantization scale by controlling the code amount on the macro block basis as in the first embodiment. Furthermore, of the video signals held in the frame buffer 102, the same image data as the macro block just to be encoded is held in the macro block buffer 112. The image data held in the macro block buffer 112 is divided into the DCT blocks of which size is smaller than the macro block, to be held in each of the DCT block buffers 113. The edge detector 114 detects the edge intensity and edge direction of each of the DCT blocks by using the image data (DCT block data) held by each of the DCT block buffers 113.

It is possible to detect the edge intensity of each of the DCT blocks by the same technique as the above-mentioned first embodiment. Furthermore, the edge direction can be detected by the same technique as the above-mentioned second embodiment.

The edge detector 114 detects the edge intensity and edge direction of each of the DCT blocks in one macro block by the technique exemplified above and the like, to output the detection results to the edge intensity calculation circuit 115. The edge intensity calculation circuit 115 puts together the information on the edge intensity and direction detected from each of the DCT blocks on the macro block basis and determines whether or not the edge is visually noticeable. Furthermore, the intensity calculation circuit 115 refers to the information on the edge intensity and direction detected from each of the DCT blocks of the macro block already encoded and adjacent to the macro block to be encoded, to determine whether or not the edge is visually noticeable across the macro blocks. It outputs the edge intensity information according to the determination results to the controller 111. The edge intensity information is used to decide the edge intensity of the macro block. The controller 111 calculates the quantization scale code for performing the actual quantization by adjusting the reference value of the quantization scale code calculated by the aforementioned calculation, in accordance with the edge intensity information calculated by the edge intensity calculation circuit 115.

Figure 5A:
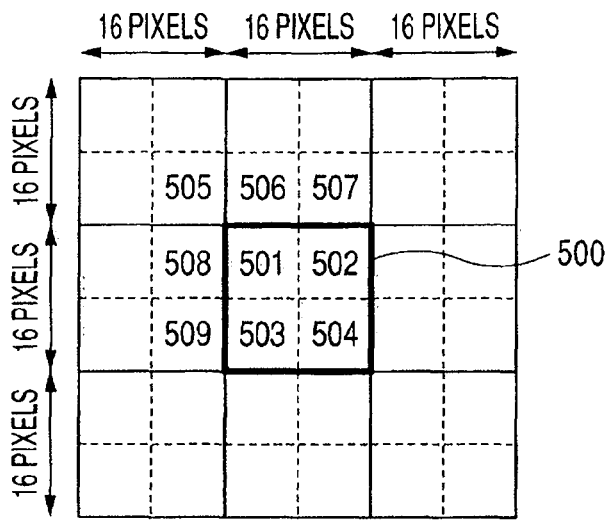
FIGS. 5A, 5B and 5C are diagrams showing examples of the information processing relating to the edge intensity and edge directions according to a third embodiment.
Figure 5B:
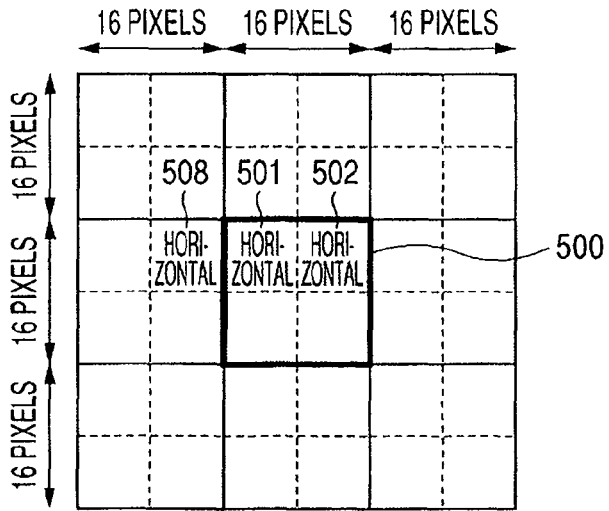
Figure 5C:
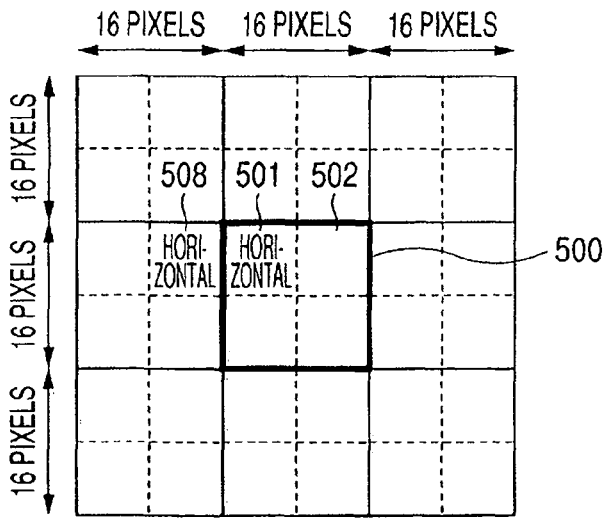

Hereunder, a description will be given as to the examples of the information processing relating to the edge intensity and edge directions according to the third embodiment. FIGS. 5A, 5B and 5C are diagrams showing the examples of the information processing relating to the edge intensity and edge directions according to the third embodiment. The examples in FIGS. 5A to 5C only show the luminance components. Reference numeral 500 of FIGS. 5A, 5B and 5C denotes the macro block to be encoded, where the macro block 500 is configured by the four DCT blocks of the luminance components represented by reference numerals 501 to 504. It is also shown that the macro block 500 has the macro blocks of the same size adjacent thereto, where each of the macro blocks is also configured by the four DCT blocks. It is also shown that the DCT block 501 has the DCT blocks denoted by reference numerals 502 to 509 adjacent thereto.

In the case where, in such a configuration, the DCT blocks 501 and 502 are detected as the horizontal edges and the DCT block 508 horizontally adjacent to the DCT block 501 is also detected as the horizontal edge as shown in FIG. 5B for instance, the edge intensity calculation circuit 115 determines that the DCT blocks 501 and 502 have the horizontal edges which are the visually noticeable edges continuing over not only the macro block 500 but a plurality of macro blocks. Thus, the edge intensity calculation circuit 115 outputs the value having multiplied the edge intensity calculated by the same method as in the first embodiment by a predetermined weighting factor as the edge intensity information on the macro block 500. The controller 111 calculates the quantization scale code for performing the actual quantization to the macro block 500 by reducing the reference value of the quantization scale code according to the edge intensity information outputted by the edge intensity calculation circuit 115.

As in FIG. 5C, in the case where the DCT block 501 is detected as the horizontal edge and the DCT block 502 horizontally adjacent to the DCT block 501 is detected as no edge while the DCT block 508 horizontally adjacent to the DCT block 501 is detected as the horizontal edge, the edge intensity calculation circuit 115 determines that the edges are the visually noticeable edges continuing over not only the macro block 500 but the plurality of macro blocks with the macro block 500 as their ending point. Thus, the edge intensity calculation circuit 115 outputs the value having multiplied the edge intensity calculated by the same method as in the first embodiment by the predetermined weighting factor as the edge intensity information on the macro block 500. The controller 111 calculates the quantization scale code for performing the actual quantization to the macro block 500 by reducing the reference value of the quantization scale code according to the edge intensity information outputted by the edge intensity calculation circuit 115.

In FIGS. 5B and 5C, the description was given as to the horizontal direction. However, the same process can also be performed as to the vertical and diagonal directions.

As described above, in the encoding process of the moving image, the image encoding apparatus of this embodiment uses the edge information on the DCT block which is a smaller block than the macro block as the edge information on the macro block and further refers to the edge information of the DCT blocks in the adjacent macro block to perform the process of deciding the quantization scale code of the macro block to be encoded. Therefore, it is possible to prevent the degradation of the image quality of the macro block partially including the edges. Furthermore, if determined that the edges are continuing over the plurality of macro blocks, the edge intensity is multiplied by the predetermined weighting factor. Thus, even in the case of the same edge intensity, the more visually noticeable the edge is, the larger the value outputted as the edge intensity becomes. Therefore, it is possible to decide the quantization scale code for performing appropriate quantization to the visually noticeable edge.

Other Embodiments

Next, the other embodiments will be introduced. The first to third embodiments described the control of the quantization scale code of the MPEG encoding method. A description will be given as to an example of applying the same idea to the MPEG4—AVC/H. 264 encoding method. FIG. 1 can be used in place of a block diagram of the MPEG4—AVC/H. 264 encoding method, and so the latter is omitted.

FIGS. 6A to 6D show the macro blocks in the MPEG4—AVC/H. 264 format and integer conversion blocks included in the macro blocks. In the case of the MPEG4—AVC/H. 264 format, the unit of integer conversion equivalent to the DCT of the MPEG is different depending on a profile. In the case of a main profile, the unit of integer conversion is four pixels in the horizontal direction and four pixels in the vertical direction, and there are sixteen integer conversion blocks of the luminance components in the macro block. In the case of a high profile, the unit of integer conversion is eight pixels in the horizontal direction and eight pixels in the vertical direction, and there are four integer conversion blocks of the luminance components in the macro block.

Figure 6A:
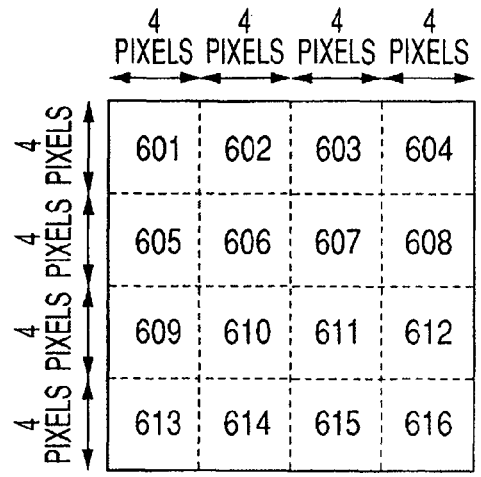
FIGS. 6A, 6B, 6C and 6D are diagrams showing examples of the information processing relating to the edge intensity and edge directions according to other embodiments.
Figure 6B:
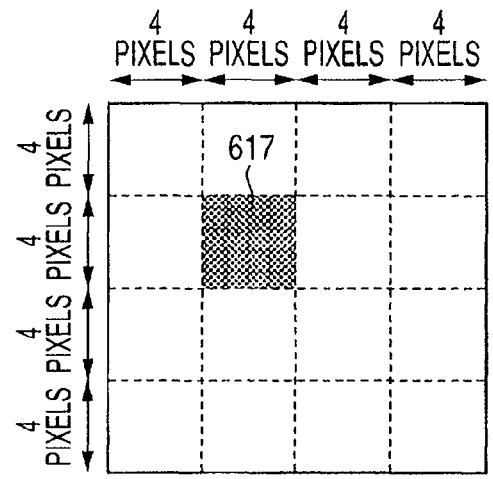
Figure 6C:
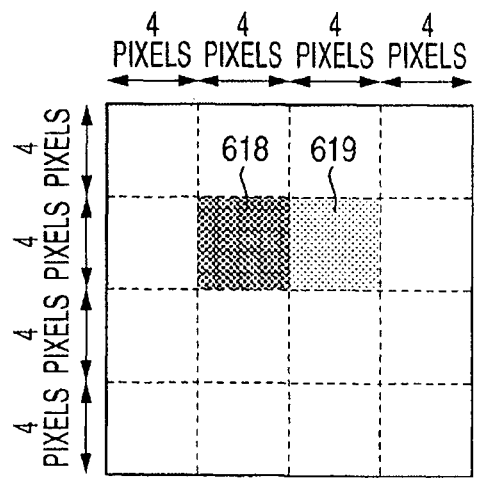
Figure 6D:
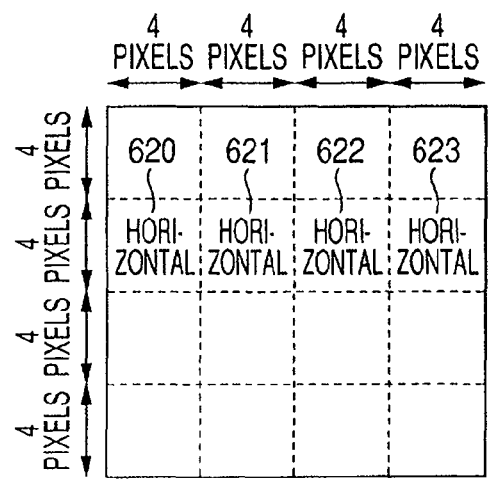

FIG. 6A is a diagram showing a relation between the macro block and the integer conversion when performing the encoding with the main profile of the MPEG4—AVC/H. 264 encoding method, where reference numerals 601 to 606 included in the macro block denote the integer conversion blocks. FIGS. 6B to 6D are diagrams showing the examples of the information processing relating to the edge intensity and edge directions.

FIG. 6B shows the case where, as a result of the edge detection performed to each of the integer conversion blocks in the macro block, it is determined that the edge only exists in one integer conversion block 617. In this case, the edge intensity calculation circuit 115 determines that the edge exists in the macro block and outputs the edge intensity of the integer conversion block 617 as the edge intensity of the macro block (the same process as FIG. 2A described in the first embodiment).

FIG. 6C shows the case where, as a result of the edge detection performed to each of the integer conversion blocks in the macro block, it is determined that the edges exist in integer conversion blocks 618 and 619. In this case, the edge intensity calculation circuit 115 determines that the edges exist in the macro block and compares the edge intensity of the integer conversion block 618 with that of the edge intensity of the integer conversion block 619 to output the higher edge intensity as the edge intensity of the macro block (the same process as FIG. 2B described in the first embodiment).

In the case where, as a result of the edge detection performed to each of the integer conversion blocks in the macro block, no edge exists in the integer conversion blocks, the edge intensity calculation circuit 115 determines that no edge exists in the macro block and outputs no edge intensity (the same process as FIG. 2C described in the first embodiment).

In the case where horizontally adjacent integer conversion blocks 620 to 623 are all determined as the horizontal edges as shown in the macro block of FIG. 6D, or in the case where, though not shown, the integer conversion blocks vertically adjacent are determined as the vertical edges, the edge intensity calculation circuit 115 determines that the visually noticeable edges exist in the macro block and outputs the value having multiplied the edge intensity by the predetermined weighting factor as the edge intensity of the macro block (the same process as FIGS. 3A and 3B described in the second embodiment).

In the case where, as a result of the edge detection performed to each of the integer conversion blocks in the macro block, it is determined that the edge directions of the integer conversion blocks are varied after detecting the edges from all the integer conversion blocks, the edge intensity calculation circuit 115 can determine that the edges exist in the macro block but are visually unnoticeable edges, to perform the same process as in the case of having no edge existing in the macro block (the same process as FIGS. 3C and 3D described in the second embodiment).

Furthermore, as with the third embodiment, it is possible to determine whether or not the edge is visually noticeable in the macro block to be encoded, from the information on the edge intensity and edge directions of the integer conversion blocks included in the macro block adjacent to the macro block to be encoded, to multiply the edge intensity by the coefficient according to that determination.

In the above mentioned embodiments, each of the processes in the edge detector 114 and the edge intensity calculation circuit 115 shown in FIG. 1 may have functions thereof implemented by reading the program for implementing the functions of each of the processes from the memory and having them executed by a CPU (Central Processing Unit).

It is also possible to implement a part of the functions of the processes in the edge detector 114 and the edge intensity calculation circuit 115 shown in FIG. 1 by means of dedicated hardware. The memory accessed by the CPU may be configured by a nonvolatile memory such as an HDD, an optical disk or a flash memory, a recording medium only capable of reading such as a CD-ROM, a volatile memory other than an RAM or a recording medium computer-readable and writeable as a combination thereof.

It is also possible to record the program for implementing the functions of the processes of the edge detector 114 and the edge intensity calculation circuit 115 shown in FIG. 1 on a computer-readable recording medium and have the program recorded thereon read and executed by a computer system so as to perform the processes. The "computer system" in this case includes an OS and the hardware such as peripherals. To be more precise, it includes the cases where the program read from the recording medium is written to the memory provided to a function enhancement board inserted into the computer or a function enhancement unit connected to the computer, and then the CPU or the like provided to the function enhancement board or the function enhancement unit performs all or a part of actual processing based on instructions of the program, which implements the functions of the aforementioned embodiments.

The "computer-readable recording medium" refers to a portable medium such as a flexible disk, a magnetic optical disk, an ROM or a CD-ROM or a storage device such as a hard disk built into the computer system. Furthermore, the "computer-readable recording medium" includes the one for retaining the program for a given length of time, such as a volatile memory (RAM) inside the computer system as a server or a client in the case of sending the program via a network such as the Internet or a communications line such as a phone line.

The program may be transmitted to another computer system from the computer system having the program stored in the storage device or the like via a transmission medium or by a transmitted wave in the transmission medium. Here, the "transmission medium" for transmitting the program refers to a medium having a function of transmitting information like a network (communication system) such as the Internet or a communications line (communication wire) such as a phone line.

The program may be the one for implementing a part of the aforementioned functions. Furthermore, it may be a so-called difference file (difference program) capable of implementing the aforementioned functions in combination with the program already recorded in the computer system.

It is also possible to apply a program product of the "computer-readable recording medium or the like having the program recorded therein as an embodiment of the present invention. The program, recording medium, transmission medium and program product are included in the category of the present invention.

The embodiments of the present invention were described above by referring to the drawings. However, the concrete configurations of the present invention are not limited to these embodiments but may include a design and the like within the scope of the present invention.

This application claims priorities from Japanese Patent Application Nos. 2004-361769 filed on Dec. 14, 2004, and 2005-310070 filed on Oct. 25, 2005, which are hereby incorporated by reference herein.

What is claimed is:

1. An image encoding apparatus comprising:
   an encoding unit configured to divide a pixel arrangement included in an image into a plurality of first blocks and perform an encoding process including quantization on the first block basis;
   an edge detecting unit configured to detect edges of a plurality of second blocks divided from each of the plurality of first blocks;
   a calculating unit configured to calculate highest edge intensity of the first block based on intensity of the edge detected by the edge detecting unit from each second block divided from the first block and output edge intensity information concerned with the highest edge intensity of the first block;
   an acquiring unit configured to acquire a reference value of a quantization scale code for the quantization on the first block based on an amount of bits generated by the encoding unit and a bit amount to be assigned to the first block; and
   an encoding controlling unit configured to receive the edge intensity information and adjust the reference value acquired by the acquiring unit in accordance with the highest edge intensity of the first block.

2. An apparatus according to claim 1, wherein the encoding unit includes:
   an orthogonal transform unit configured to perform an orthogonal transform to image data divided on the second block basis and output an orthogonal transform coefficient,
   a quantizing unit configured to perform the quantization to the orthogonal transform coefficient outputted by the orthogonal transform unit on the first block basis and output a quantization coefficient,
   wherein the reference value adjusted by the encoding controlling unit is information for deciding a quantization scale code to be used by the quantizing unit.

3. An apparatus according to claim 1, wherein the calculating unit calculates the highest edge intensity of the first block based on highest intensity of the edges in the plurality of second blocks.

4. An apparatus according to claim 1, wherein, when no edge exists in the plurality of second blocks, the calculating unit outputs no edge intensity information or outputs edge intensity information indicating edge intensity=0.

5. An apparatus according to claim 1, wherein the first block includes four of the second blocks and is configured in a form of arranging two of the second blocks in a horizontal direction and two of the second blocks in a vertical direction.

6. An apparatus according to claim 1, wherein the first block includes sixteen of the second blocks and is configured in a form of arranging four of the second blocks in a horizontal direction and four of the second blocks in a vertical direction.

7. An apparatus according to claim 1, wherein the first block is a macro block, and the second block is a DCT block or an integer conversion block.

8. A method comprising:
   an encoding step of dividing a pixel arrangement included in an image into a plurality of first blocks and performing an encoding process including quantization on the first block basis;
   an edge detecting step of detecting edges of a plurality of second blocks divided from each of the plurality of first blocks;
   a calculating step of calculating highest edge intensity of the first block based on intensity of the edge detected in the edge detecting step from each second block divided from the first block and outputting edge intensity information concerned with the highest edge intensity of the first block;
   an acquiring step of acquiring a reference value of a quantization scale code for the quantization on the first block based on an amount of hits generated in the encoding step and a bit amount to be assigned to the first block; and
   an encoding controlling step of receiving the edge intensity information and adjusting the reference value acquired in the acquiring step in accordance with the highest edge intensity of the first block.

9. A method according to claim 8, further comprising:
an orthogonal transforming step of performing an orthogonal transform to image data divided on the second block basis and generating an orthogonal transform coefficient, and
a quantizing step of performing the quantization to the orthogonal transform coefficient on the first block basis and generating a quantization coefficient,
wherein the reference value adjusted in the encoding controlling step is information for deciding a quantization scale code to be used in the quantizing step.

10. A method according to claim 8, wherein the highest edge intensity of the first block is calculated based on highest intensity of the edges in the plurality of second blocks.

11. A method according to claim 8, further comprising
outputting no edge intensity information or outputting edge intensity information indicating edge intensity=0, when no edge exists in the plurality of second blocks.

12. A method according to claim 8, wherein the first block includes four of the second blocks and is configured in a form of arranging two of the second blocks in a horizontal direction and two of the second blocks in a vertical direction.

13. A method according to claim 8, wherein the first block includes sixteen of the second blocks and is configured in a form of arranging four of the second blocks in a horizontal direction and four of the second blocks in a vertical direction.

14. A method according to claim 8, wherein the first block is a macro block, and the second block is a DCT block or an integer conversion block.

15. A non-transitory computer-readable storage medium storing a program for causing a computer to execute a method, the method comprising:
an encoding step of dividing a pixel arrangement included in an image into a plurality of first blocks and performing an encoding process including quantization on the first block basis;
an edge detecting step of detecting edges of a plurality of second blocks divided from each of the plurality of first blocks;
a calculating step of calculating highest edge intensity of the first block based on intensity of the edge detected in the edge detecting step from each second block divided from the first block and outputting edge intensity information concerned with the highest edge intensity of the first block;
an acquiring step of acquiring a reference value of a quantization scale code for the quantization on the first block based on an amount of bits generated in the encoding step and a bit amount to be assigned to the first block; and
an encoding controlling step of receiving the edge intensity information and adjusting the reference value acquired in the acquiring step in accordance with the highest edge intensity of the first block.

* * * * *